United States Patent
Khatri et al.

(10) Patent No.: US 10,824,724 B2
(45) Date of Patent: Nov. 3, 2020

(54) DETECTING RUNTIME TAMPERING OF UEFI IMAGES IN AN INFORMATION HANDLING SYSTEM

(71) Applicant: DELL PRODUCTS, L.P., Round Rock, TX (US)

(72) Inventors: Mukund P. Khatri, Austin, TX (US); William C. Munger, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 337 days.

(21) Appl. No.: 15/612,968

(22) Filed: Jun. 2, 2017

(65) Prior Publication Data

US 2018/0349604 A1 Dec. 6, 2018

(51) Int. Cl.
G06F 21/56 (2013.01)
G06F 13/42 (2006.01)
H04L 9/32 (2006.01)
G06F 21/57 (2013.01)

(52) U.S. Cl.
CPC ........ *G06F 21/566* (2013.01); *G06F 13/4282* (2013.01); *G06F 21/572* (2013.01); *H04L 9/3239* (2013.01); *G06F 2213/0026* (2013.01); *G06F 2221/034* (2013.01)

(58) Field of Classification Search
CPC .. G06F 21/566; G06F 13/4282; G06F 21/572; G06F 2213/0026; G06F 2221/034; H04L 9/3236; H04L 9/3239
See application file for complete search history.

(56) References Cited

U.S. PATENT DOCUMENTS

| | | | | |
|---|---|---|---|---|
| 8,887,144 | B1* | 11/2014 | Marr | G06F 8/65 717/168 |
| 9,129,113 | B2* | 9/2015 | Henry | G06F 21/572 |
| 2004/0073806 | A1* | 4/2004 | Zimmer | G06F 21/57 713/189 |

(Continued)

OTHER PUBLICATIONS

Y. Hu and H. Lv, "Design of Trusted BIOS in UEFI Base on USBKEY," 2011 International Conference on Intelligence Science and Information Engineering, Wuhan, 2011, pp. 164-166. (Year: 2011).*

(Continued)

*Primary Examiner* — Jung W Kim
*Assistant Examiner* — Sameera Wickramasuriya
(74) *Attorney, Agent, or Firm* — Isidore PLLC

(57) ABSTRACT

A method, an information handling system (IHS) and a detection system for detecting runtime tampering of unified extensible firmware interface (UEFI) images in an IHS. The method includes retrieving, via a board management controller (BMC) from a first memory device, a first UEFI driver associated with a first component of the IHS. The method also includes generating a first hash of the first UEFI driver and retrieving, from a second memory device, a second hash associated with an initial first UEFI driver of the first component of the IHS. The method further includes determining if the first hash and the second hash match, and in response to the first hash and the second hash not matching, generating an error message that indicates detection of runtime tampering with the first UEFI driver and storing the error message to an error log.

20 Claims, 5 Drawing Sheets

(56) References Cited

U.S. PATENT DOCUMENTS

| | | | |
|---|---|---|---|
| 2009/0144332 A1 | 6/2009 | Montgomery | |
| 2012/0102580 A1* | 4/2012 | Bealkowski | G06F 21/86 |
| | | | 726/34 |
| 2014/0040605 A1* | 2/2014 | Futral | G06F 9/445 |
| | | | 713/2 |
| 2014/0365755 A1* | 12/2014 | Liu | G06F 21/572 |
| | | | 713/2 |
| 2015/0134978 A1* | 5/2015 | Henry | G06F 21/572 |
| | | | 713/194 |
| 2015/0220736 A1 | 8/2015 | Martinez et al. | |
| 2016/0055068 A1* | 2/2016 | Jeansonne | G06F 21/572 |
| | | | 714/15 |
| 2016/0070913 A1* | 3/2016 | Kulkarni | G06F 21/575 |
| | | | 713/2 |
| 2016/0147996 A1* | 5/2016 | Martinez | G06F 21/572 |
| | | | 713/2 |
| 2016/0180094 A1 | 6/2016 | Dasar et al. | |
| 2017/0010875 A1 | 1/2017 | Martinez et al. | |
| 2017/0098084 A1 | 4/2017 | Kulkarni et al. | |
| 2017/0168844 A1* | 6/2017 | Swanson | G06F 9/4401 |
| 2017/0344294 A1* | 11/2017 | Mishra | G06F 3/0622 |
| 2018/0239900 A1* | 8/2018 | Stewart | G06F 11/3604 |

OTHER PUBLICATIONS

F. Zhang, "IOCheck: A framework to enhance the security of I/O devices at runtime," 2013 43rd Annual IEEE/IFIP Conference on Dependable Systems and Networks Workshop (DSN-W), Budapest, 2013, pp. 1-4, doi: 10.1109/DSNW.2013.6615523. (Year: 2013).*

* cited by examiner

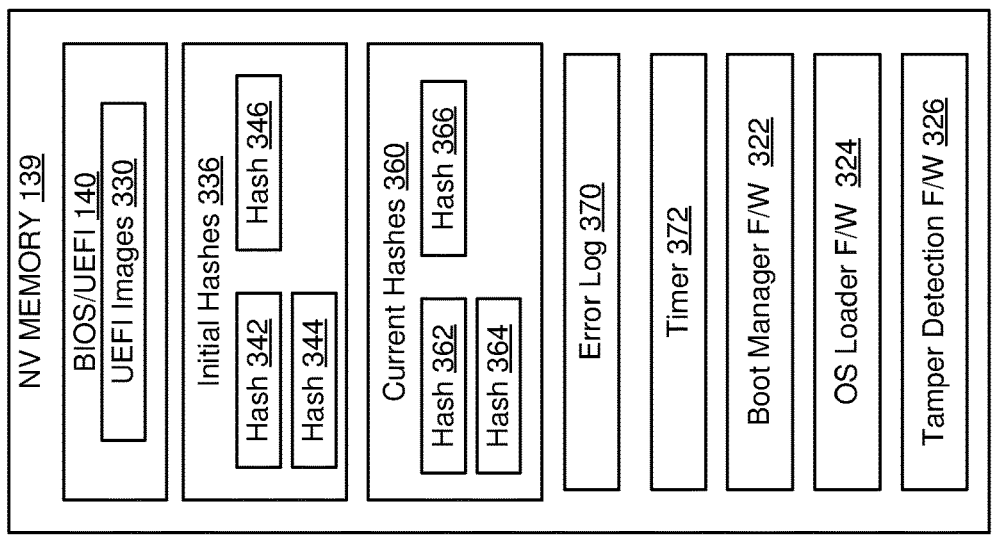
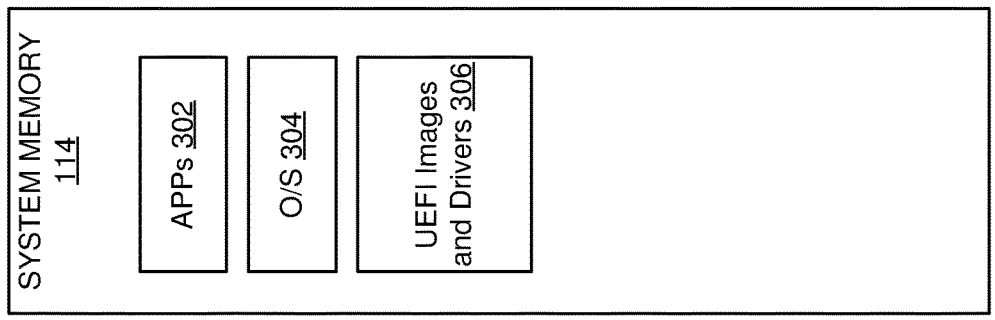
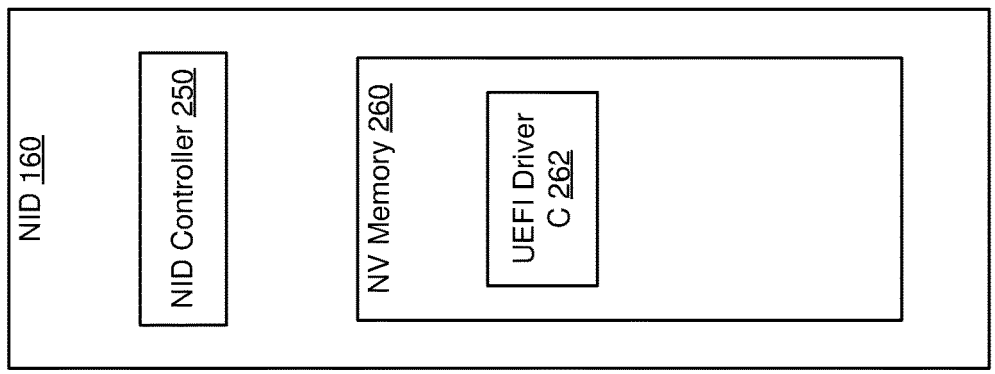
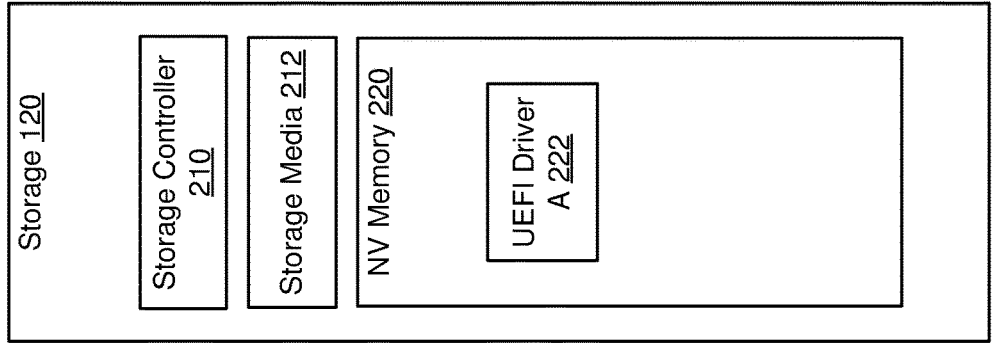

DETECTING RUNTIME TAMPERING OF UEFI IMAGES IN AN INFORMATION HANDLING SYSTEM

BACKGROUND

1. Technical Field

The present disclosure generally relates to information handling systems and in particular to detecting runtime tampering of unified extensible firmware interface (UEFI) images in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Unified extensible firmware interface (UEFI) is a specification that defines a software interface between an operating system and platform firmware. UEFI replaces the basic input/output system (BIOS) found on older information handling systems. UEFI provides a standard architecture and data structure to manage initialization and configuration of devices, booting of platform resources, and passing of control to the operating system. The UEFI specification allows for the extension of platform firmware by loading UEFI driver and application images.

If a UEFI driver or image is compromised during a computer attack, the tampering may not be detected until the next time the system is booted or re-booted. For servers, the next boot may not occur until planned downtime or after a power failure, which can be weeks or months later. Unfortunately, when the tampering is detected during the next system boot, the information handling system may be prevented from booting and be placed out of service until the problem can be resolved.

BRIEF SUMMARY

Disclosed are a method, an information handling system (IHS), and a detection system for detecting runtime tampering of unified extensible firmware interface (UEFI) images in an IHS.

According to one embodiment, the method includes retrieving, via a board management controller (BMC) from a first memory device, a first UEFI driver associated with a first component of the IHS and generating a first hash of the first UEFI driver. The method also includes retrieving, from a second memory device, a second hash associated with an initial first UEFI driver of the first component of the IHS. The method further includes determining if the first hash and the second hash match and, in response to the first hash and the second hash not matching, generating an error message that indicates detection of runtime tampering with the first UEFI driver and storing the error message to an error log. The matching of the first hash and the second hash indicates that no runtime tampering of the UEFI drivers and images has been detected. The IHS is allowed to continue to operate when the first hash and the second hash match.

According to another embodiment, the IHS includes a first IHS component having a first memory device and a board management controller (BMC) communicatively coupled to the first IHS component and the first memory device. The IHS also includes a processor communicatively coupled to a second memory device, the BMC, the first IHS component, and the first memory device. The BMC has firmware executing thereon for detecting runtime tampering of unified extensible firmware interface (UEFI) drivers. The firmware configures the BMC to retrieve from the first memory device, a first UEFI driver associated with the first IHS component and generate a first hash of the first UEFI driver. The firmware also configures the BMC to retrieve, from the second memory device, a second hash associated with an initial first UEFI driver of the first IHS component. The firmware further configures the BMC to determine if the first hash and the second hash match, and in response to the first hash and the second hash not matching, generate an error message that indicates detection of runtime tampering with the first UEFI driver and store the error message to an error log. The matching of the first hash and the second hash indicates that no runtime tampering of the UEFI drivers and images has been detected. The IHS is allowed to continue to operate when the first hash and the second hash match.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A illustrates example components within an example storage device, in accordance with one embodiment;

FIG. 2B illustrates example components within an example network interface device, in accordance with one embodiment;

FIG. 3A illustrates example contents of a system memory in an IHS, in accordance with one embodiment;

FIG. 3B illustrates example contents of a non-volatile storage device, in accordance with one embodiment;

DETAILED DESCRIPTION

Figure 1:
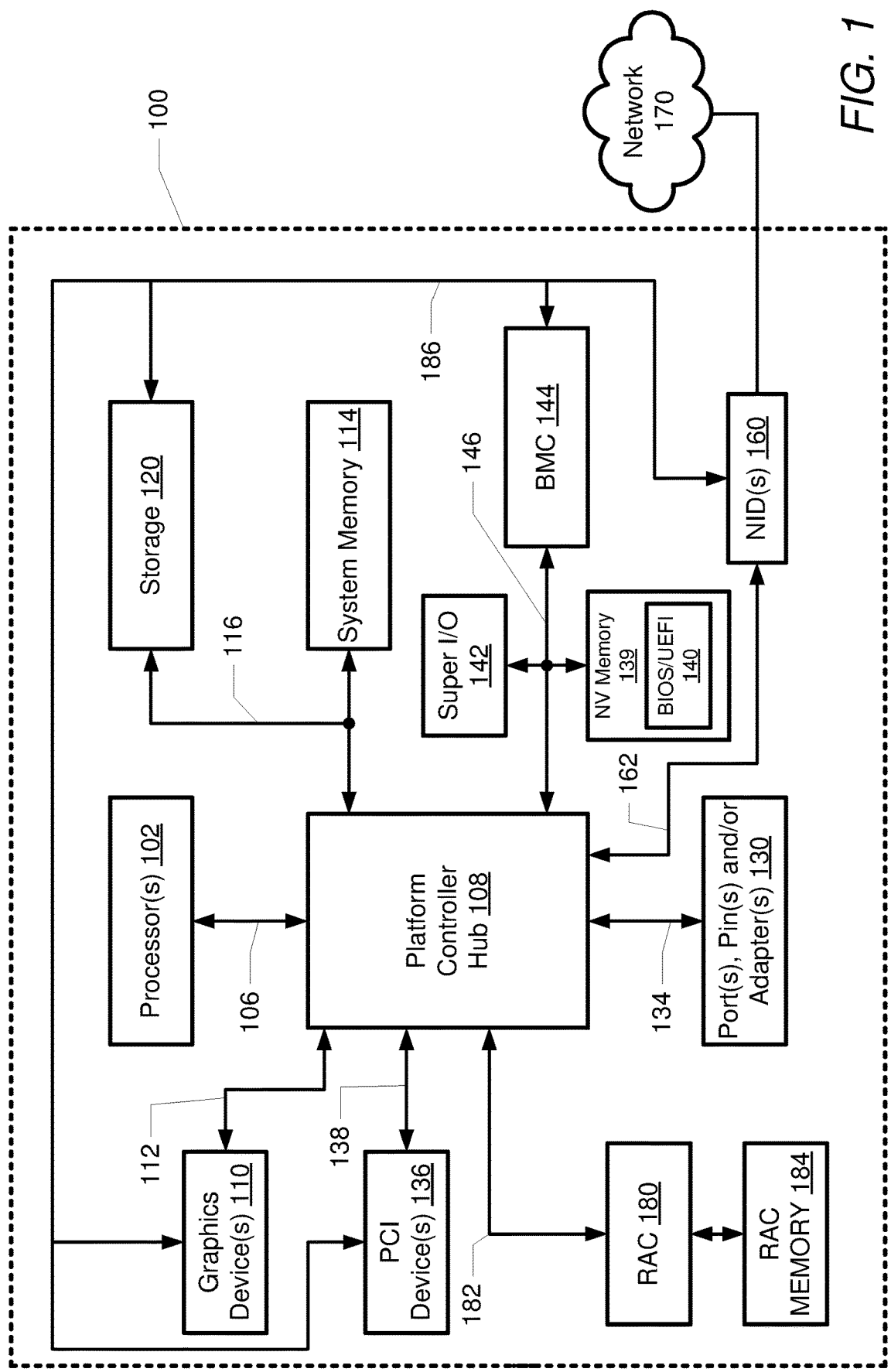
FIG. 1 illustrates one example of an IHS within which various aspects of the disclosure can be implemented, according to one or more embodiments.

The illustrative embodiments provide a method, an information handling system (IHS), and a detection system for detecting runtime tampering of unified extensible firmware interface (UEFI) images in an IHS.

The method includes retrieving, via a board management controller (BMC) from a first memory device, a first UEFI driver associated with a first component of the IHS. The method also includes generating a first hash of the first UEFI driver and retrieving, from a second memory device, a second hash associated with an initial first UEFI driver of the first component of the IHS. The method further includes determining if the first hash and the second hash match and in response to the first hash and the second hash not matching, generating an error message that indicates detection of runtime tampering with (or modification or replacement of) the first UEFI driver, and storing the error message to an error log. The IHS is allowed to continue to operate when the first hash and the second hash match. The matching of the first hash and the second hash indicates that no runtime tampering of the UEFI drivers and images has been detected.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to a chipset or platform controller hub (PCH) 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via system bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by system bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over input/output (I/O) bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over I/O bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in association with IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory 139 stores a basic input output system/unified extensible firmware interface (BIOS/UEFI) 140. PCH 108 is also coupled to super I/O Controller 142 and baseboard management controller (BMC) 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes a board management controller (BMC) 144 that is in communication with NV memory 139, which can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse, and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 also includes a sideband bus 186 that communicatively couples BMC 144 to several IHS components including graphics devices 110, storage 120, PCI devices 136 and NID(s) 160. Sideband bus 186 can also communicatively couple BMC 144 to other components and devices within IHS 100. BMC 144 can use sideband bus 186 to send and receive data and images to IHS components connected to sideband bus 186. Sideband bus 186 can utilize any computer bus capable of communications between BMC 144 and other IHS components including graphics devices 110, storage 120, PCI devices 136 and NID(s) 160. In one embodiment, sideband bus 186 can utilize one of several bus protocols such as a low pin count (LPC) bus, an inter-integrated circuit (I2C) bus and a serial general purpose input/output (SGPIO) bus. An LPC bus is a computer bus that is used to connect low-bandwidth devices. An I2C bus is a multi-master, multi-slave, packet switched, single-ended, serial computer bus. A SGPIO bus is a four-signal (or four-wire) computer bus.

In another embodiment, LPC bus 146 and/or sideband bus 186 can be a peripheral component interconnect express (PCIe) bus that utilizes a management component transport protocol (MCTP). MCTP is a bus protocol that supports communications between different intelligent hardware components that make up a platform management subsystem. MCTP further provides monitoring and control functions. The MCTP protocol is independent of the underlying physical bus properties, as well as the data link layer messaging used on the bus. The MCTP communication model includes a message format, transport description, message exchange patterns, and operational endpoint characteristics. PCIe MCTP allows BMC 144 to communicate with various components or devices of IHS 100 such as graphics devices 110, storage 120, PCI devices 136 and NID(s) 160.

IHS 100 further includes a remote access controller (RAC) 180 coupled via PCI bus 182 to PCH 108. RAC 180 provides management functions that allow an administrator to deploy, monitor, manage, configure, update, troubleshoot, and remediate IHS 100. RAC 180 is also coupled to RAC memory 184. In one embodiment, RAC memory 184 can be shared with processor(s) 102.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

In an embodiment, a motherboard (not specifically shown) is provided that is configured to provide structural support, power, and electrical connectivity between the various aforementioned components. Such a motherboard may include multiple connector sockets in various configurations, adapted to receive pluggable circuit cards, component chip packages, etc.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

In the description of each of the following figures, reference is also made to specific components illustrated within the preceding figures. With reference now to FIG. 2A, one embodiment of storage 120 of IHS 100 is shown. Storage 120 includes storage controller 210, storage media 212, and non-volatile (NV) memory 220. Storage controller 210 can manage and control the operation of storage 120. Storage media 212 can include hard drives or solid-state drives. NV memory 220 is a data storage device that retains its stored data even when electrical power is removed. As illustrated, NV memory 220 can contain UEFI driver A 222. UEFI driver A 222 can be loaded into system memory 114 during start-up or booting of IHS 100 in order to facilitate the operation of storage 120 within IHS 100.

FIG. 2B illustrates one embodiment of NID 160. NID 160 includes NID controller 250 and NV memory 260. NID controller 250 can manage and control the operation of NID 160. NV memory 260 can contain UEFI driver C 262. UEFI driver C 262 can be loaded into system memory 114 during start-up or booting of IHS 100 in order to facilitate the operation of NID 160 within IHS 100.

With reference now to FIG. 3A, one embodiment of example contents of system memory 114 of IHS 100 is shown. System memory 114 includes data, software, and/or firmware modules, including application(s) 302, operating system (O/S) 304 and UEFI images and drivers 306. System memory 114 can also include other data, software, and/or firmware modules. UEFI images and drivers 306 are program instructions usable by processor 102 that are loaded during booting of OS 304 onto IHS 100 to facilitate communications and operation of components of IHS 100.

Turning to FIG. 3B, one embodiment of example contents of NV memory 139 of IHS 100 is shown. NV memory 139 includes BIOS/UEFI 140, initial hashes 336, current hashes 360, error log 370 and timer 372. BIOS/UEFI 140 can include UEFI images 330 that can be loaded during system start-up or booting by IHS 100. Initial hashes 336 are unique values generated by a hash function of approved and/or verified UEFI images and drivers. Hashes can be used to uniquely identify information. In one embodiment, the hash function can be a secure hash function such as the SHA-1 hash function. According to one aspect of the disclosure, initial hashes 336 of initial UEFI images and drivers are generated and stored during the initial booting of IHS 100 and are used for a later comparison during runtime. Initial hashes 336 further include hash 342 of the initial UEFI images 330, hash 344 of the initial UEFI driver A 222 and hash 346 of the initial UEFI driver C 262.

According to another aspect of the disclosure, current hashes 360 of UEFI images and drivers are periodically generated and stored during runtime of IHS 100 and are periodically compared to initial hashes 336. Current hashes 360 include hash 362 of the current UEFI image 330, hash 364 of the current UEFI driver A 222 and hash 366 of the current UEFI driver C 262.

Current hashes 360 are values generated by a hash function of the current UEFI images and drivers (e.g. current UEFI image 330, current UEFI driver A 222 and current UEFI driver C 262). Error log 370 contains error messages generated by BMC 144 when tampering of UEFI images and/or drivers is detected during runtime of IHS 100. Timer 372 can have a pre-determined expiration time value.

NV memory 139 further includes boot manager firmware (F/W) 322, OS loader F/W 324, and tamper detection F/W 326. Boot manager 322 operates during the device execution phase (DXE) of booting and facilitates the loading of UEFI images and drivers 306. OS loader F/W 324 operates during the transient system load phase of booting and facilitates the loading of OS 304. Tamper detection F/W 326 operates during runtime to facilitate the detection of tampered UEFI images and/or drivers. Tamper detection F/W 326 performs the processes presented in the flowcharts of FIGS. 5 and 6.

Figure 4:
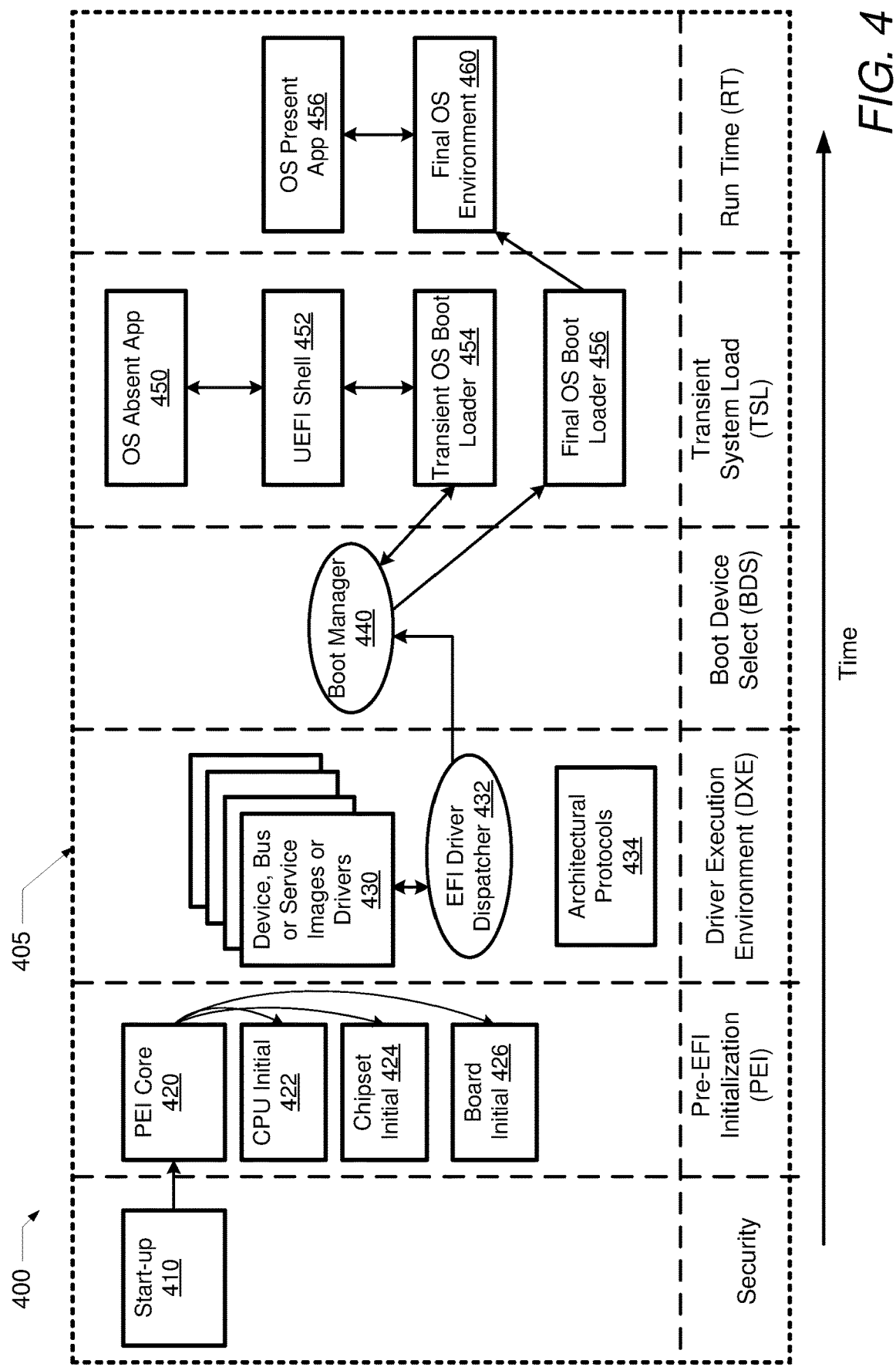
FIG. 4 illustrates a timeline of a boot-up operation for an IHS, in accordance with one embodiment.

FIG. 4 illustrates a timeline 400 of a boot operation (or boot process) 405 for IHS 100. Timeline 400 begins at start-up 410, which involves a security phase, where processor 102 is started. At a pre-extensible firmware interface initialization (PEI) phase, a PEI core operation 420 is performed. During the PEI core operation 420, memory is initialized and firmware volume locations are described in hand off blocks. Next, a CPU initialization 422 of processor 102 occurs, followed by chipset initialization 424 and then motherboard initialization 426. At a driver execution environment (DXE) phase, EFI driver dispatcher 432 retrieves device, bus or service images or drivers 430 depending upon the architectural protocols 434 associated with IHS 100. During the DXE phase, if a secure boot process or mode is enabled, an authentication check of UEFI images 430 occurs. If the secure boot process or mode is not enabled, an authentication check of UEFI images 430 does not occur during the DXE phase. The secure boot process or policy prevents the loading of drivers or images that are not signed with an acceptable digital signature. When secure boot is enabled, IHS 100 is initially placed in "setup" mode, which allows a public key known as the "Platform key" (PK) to be written to the firmware. Once the key is written, secure boot enters "User" mode, where only drivers and loaders signed with an authorized key can be loaded by the firmware.

EFI driver dispatcher 432 transmits device, bus or service images or drivers 430 to boot manager 440 during the boot device selection (BDS) phase. At the transient system load (TSL) phase, either transient OS boot loader 454 or final OS boot loader 456 loads device, bus or service images or drivers 430 to start OS 304. If transient OS boot loader 454 is selected to run, then IHS 100 enters a UEFI shell environment 452 and triggers OS absent application 450 to run. If final OS boot loader 456 is selected to run, IHS 100 loads OS 304, enters the final OS environment 460, and triggers OS present application 456 to run during the run time phase. One or more of the described embodiments occurs during the run time phase.

In one embodiment, tamper detection F/W 326, executes on BMC 144. During an initial start-up process of IHS 100, BMC 144, via sideband bus 186, retrieves from NV memory 220, UEFI driver (e.g., UEFI driver A 222) associated with a component/device (e.g., storage 120) of the IHS. Also, during the initial start-up process, BMC 144 generates an initial hash (e.g., hash 342) of the initial UEFI driver A 222 and stores the initial hash 342 to NV memory 139. At a later time, tamper detection F/W 326, executing on BMC 144, via sideband bus 186, retrieves from NV memory 220, UEFI driver (e.g., UEFI driver A 222) associated with a component/device (e.g., storage 120) of the IHS. BMC 144 generates a current hash (e.g., hash 364) of the current UEFI driver A 222. BMC 144 retrieves, from NV memory 139, an initial hash (e.g., hash 344) of an initial UEFI driver A 222. BMC 144 determines if the current hash (e.g., hash 364) and the initial hash (e.g., hash 344) match. In response to the hashes not matching, BMC 144 generates an error message that indicates detection of runtime tampering with (or modification or replacement of) the UEFI driver and/or image and stores the error message to error log 370. The matching of the current hash to the initial hash indicates that no tampering of the UEFI drivers and images has been detected and IHS 100 is allowed to continue operation.

Figure 5:
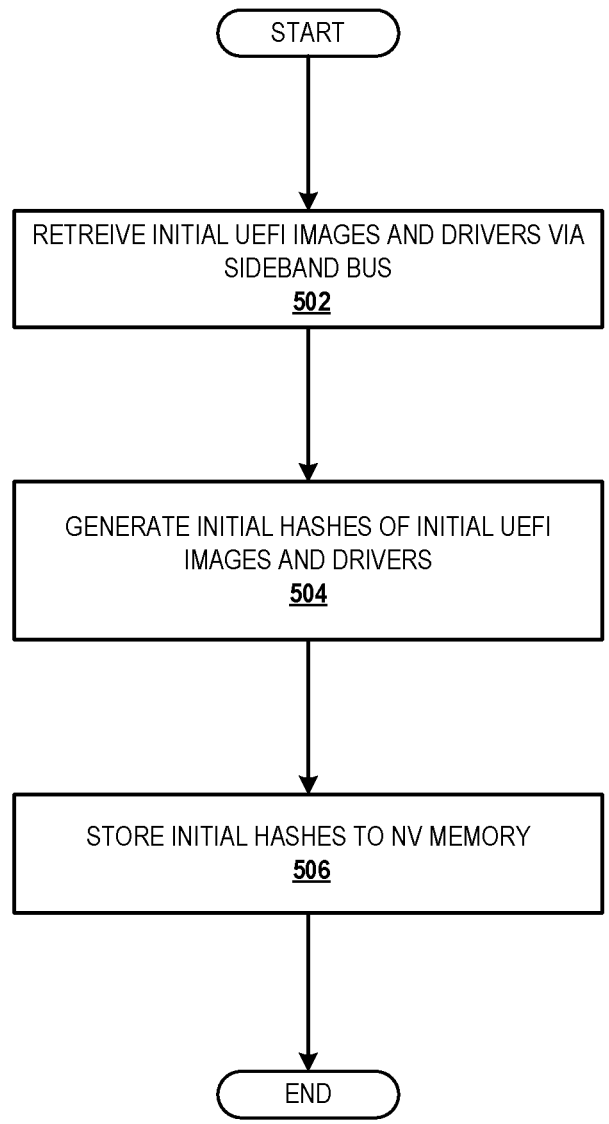
FIG. 5 is a flow chart illustrating one example of a method for generating initial hashes of initial UEFI images, according to one or more embodiments.
Figure 6:
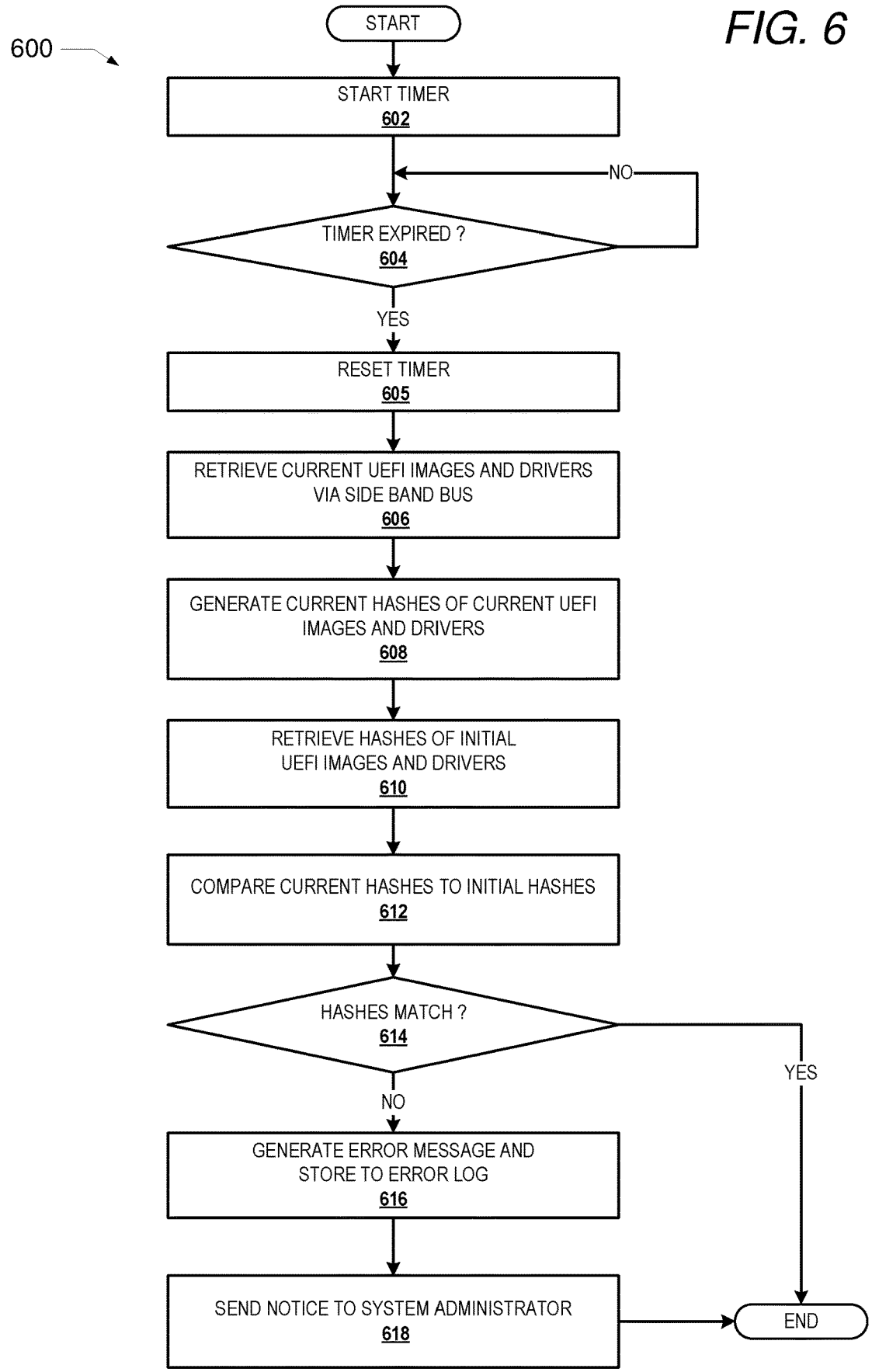
FIG. 6 is a flow chart illustrating one example of a method for detecting runtime tampering of UEFI images in an IHS, according to one or more embodiments.

FIGS. 5 and 6 illustrate flowcharts of exemplary methods 500 and 600 by which BMC 144 within the preceding figures performs different aspects of the processes that enable the one or more embodiments of the disclosure. Generally, method 500 represents a method for generating initial hashes of initial UEFI images and/or drivers. Method 600 represents a method for detecting runtime tampering of UEFI images and/or drivers in an IHS.

The description of methods 500 and 600 is provided with general reference to the specific components illustrated within the preceding FIGS. 1-4. Generally, methods 500 and 600 are described as being implemented via BMC 144 and particularly the execution of code provided by tamper detection F/W 326 acting within BMC 144. It is however appreciated that certain aspects of the described methods may be implemented via other processing devices and/or execution of other code.

Method 500 is performed during an initialization process of IHS 100 or during the first boot-up of IHS 100. Method 500 is performed subsequent to the initiation of runtime. Referring to the flow chart of FIG. 5, method 500 begins at the start block and proceeds to block 502 where BMC 144, via sideband bus 186, retrieves (i) an initial UEFI driver A 222 from NV memory 220 (ii) an initial UEFI driver C 262 from NV memory 260, and (iii) initial UEFI images 330 from NV memory 139. BMC 144 generates initial hashes 336 (e.g., hashes 342, 344 and 346) of the respective initial UEFI drivers 222, 262 and UEFI images 330 (block 504). BMC 144 stores the initial hashes 336 (e.g., hashes 342, 344 and 346) to NV memory 139 (block 506). Method 500 then ends.

FIG. 6 illustrates a method for detecting runtime tampering of UEFI images and/or drivers in an IHS. Method 600 is performed during the runtime operation of IHS 100 and at a later time than method 500. Method 600 begins at the start block and proceeds to block 602 where BMC 144 starts timer 372 that has a pre-determined expiration time. BMC 144 determines if timer 372 has expired (decision block 604). In response to timer 372 not being expired, BMC 144 continues to determine if the timer has expired at block 604. In response to timer 372 being expired, BMC 144 resets timer 372 (block 605) and BMC 144 retrieves the current UEFI images and drivers within IHS 100 (block 606). BMC 144, via sideband bus 186, retrieves from NV memory 220, a current UEFI driver A 222 and from NV memory 260, a current UEFI driver C 262. BMC 144 retrieves current UEFI images 330 from NV memory 139.

BMC 144 generates current hashes 360 (e.g., hashes 362, 364 and 366) of the respective current UEFI drivers 222, 262 and UEFI images 330 (block 608) retrieved from their respective devices. BMC 144 retrieves the initial hashes 336 (e.g., hashes 342, 344 and 346) from NV memory 139 (block 610). BMC 144 compares the current hashes 360 (e.g., hashes 362, 364 and 366) to the corresponding initial hashes 336 (e.g., hashes 342, 344 and 346) (block 612). BMC 144 determines if the current hashes 360 (e.g., hashes 362, 364 and 366) match or are the same as the corresponding initial hashes 336 (e.g., hashes 342, 344 and 346) (decision block 614). In response to the current hashes 360 matching or being the same as the initial hashes 336, method 600 ends. The current hashes 360 matching the initial hashes 336, indicates that no tampering of the stored UEFI drivers and/or images has been detected and no additional actions are required. The IHS is allowed to continue to operate normally when the current hashes match the initial hashes. In response to one or more of the current hashes 360 not matching or not being the same as the initial hashes 336, BMC 144 generates an error message that indicates detection of runtime tampering with the UEFI driver and/or image and stores the error message to error log 370 (block 616). BMC 144 sends a notice to a system administrator that tampering of UEFI images and/or drivers has been detected during runtime (block 618). In one embodiment, the specific image or driver that has been tampered with is identified within the notice. Alternatively, or in conjunction, the administrator may receive a general error notification and determine the specifics of the tampering by accessing the stored error log. The system administrator can then determine the appropriate action to take with respect to the operation of IHS 100 after tampering of the stored UEFI drivers and/or images has been detected. Method 600 then terminates. Method 600 repeats on a periodic basis during the operation of IHS 100 at a frequency determined by the expiration time of timer 372.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for detecting runtime tampering of unified extensible firmware interface (UEFI) drivers in an information handling system (IHS), the method comprising:

retrieving, via a board management controller (BMC) from a first memory device, a first UEFI driver associated with a first component of the IHS;
generating a first hash of the first UEFI driver;
retrieving, from a second memory device, a second hash associated with an initial first UEFI driver of the first component of the IHS, the second hash generated from the initial first UEFI driver during a first boot-up of the IHS, subsequent to an initiating of runtime;
determining if the first hash and the second hash match; and
in response to the first hash and the second hash not matching:
generating an error message that indicates detection of runtime tampering with the first UEFI driver; and
storing the error message to an error log that contains error messages, each of which are generated by the BMC when tampering with a corresponding UEFI image or driver is detected during runtime of the IHS.

2. The method of claim 1, further comprising:
sending a notice to a system administrator that the first UEFI driver is not the corresponding initial first UEFI driver.

3. The method of claim 1, further comprising:
during an initialization process of the IHS:
retrieving, from the first memory device, the initial first UEFI driver associated with the first component/device of the IHS;
generating the second hash from the initial first UEFI driver;
associating the second hash with the initial first UEFI driver; and
storing the second hash to the second memory device.

4. The method of claim 1, further comprising:
during operation of the IHS:
starting a timer;
determining if the timer has expired; and
in response to the timer expiring: initiating retrieval of the first UEFI driver from the first memory device; and resetting and restarting the timer.

5. The method of claim 1, wherein the BMC is communicatively coupled to the first memory device via a sideband bus.

6. The method of claim 5, wherein the sideband bus communicatively couples the BMC to at least one of:
a storage device;
a network interface device;
a graphics device; and
a peripheral component interconnect device.

7. The method of claim 5, wherein the sideband bus is at least one of:
a low pin count bus;
an inter-integrated circuit (I2C) bus;
a serial general purpose input/output (SGPIO) bus; and
a peripheral component interconnect express (PCIe) bus.

8. An information handling system (IHS) comprising:
a first IHS component having a first memory device;
a board management controller (BMC) communicatively coupled to the first IHS component and the first memory device;
a processor communicatively coupled to a second memory device, the BMC, the first IHS component, and the first memory device, the BMC having firmware executing thereon for detecting runtime tampering of unified extensible firmware interface (UEFI) drivers, wherein the firmware configures the BMC to:
retrieve from the first memory device, a first UEFI driver associated with a first component of the IHS;
generate a first hash of the first UEFI driver;
retrieve, from the second memory device, a second hash associated with an initial first UEFI driver of the first component of the IHS, the second hash generated from the initial first UEFI driver during a first boot-up of the IHS, subsequent to an initiating of runtime;
determine if the first hash and the second hash match; and
in response to the first hash and the second hash not matching:
generate an error message that indicates detection of runtime tampering with the first UEFI driver; and
store the error message to an error log that contains error messages that are each generated by the BMC when tampering with a corresponding UEFI image or driver is detected during runtime of the IHS.

9. The information handling system of claim 8, wherein the firmware further configures the BMC to:
send a notice to a system administrator that the first UEFI driver is not the corresponding initial first UEFI driver.

10. The information handling system of claim 8, wherein the firmware further configures the BMC to:
during an initialization process of the IHS:
retrieving, from the first memory device, the initial first UEFI driver associated with the first component of the IHS;
generating the second hash from the initial first UEFI driver;
associating the second hash with the initial first UEFI driver; and
storing the second hash to the second memory device.

11. The information handling system of claim 8, wherein the firmware further configures the BMC to:
during operation of the IHS:
start a timer;
determine if the timer has expired; and
in response to the timer expiring, initiate retrieving of the first UEFI driver from the first memory device; and resetting and restarting the timer.

12. The information handling system of claim 8, wherein the BMC is communicatively coupled to the first memory device via a sideband bus.

13. The information handling system of claim 12, wherein the sideband bus communicatively couples the BMC to at least one of:
a storage device;
a network interface device;
a graphics device; and
a peripheral component interconnect device.

14. The information handling system of claim 12, wherein the sideband bus is at least one of:
a low pin count bus;
an inter-integrated circuit (I2C) bus;
a serial general purpose input/output (SGPIO) bus; and
a peripheral component interconnect express (PCIe) bus.

15. A detection system for detecting runtime tampering of unified extensible firmware interface (UEFI) drivers in an information handling system (IHS), the detection system comprising:
a first IHS component having a first memory device;
a board management controller (BMC) communicatively coupled to the first IHS component and the first memory device;

a processor communicatively coupled to a second memory device, the BMC, the first IHS component and the first memory device, the BMC having firmware executing thereon for detecting runtime tampering of unified extensible firmware interface (UEFI) drivers, wherein the firmware configures the BMC to:
retrieve from the first memory device, a first UEFI driver associated with a first component/device of the IHS;
generate a first hash of the first UEFI driver;
retrieve, from the second memory device, a second hash associated with an initial first UEFI driver of the first component of the IHS, the second hash generated from the initial first UEFI driver during a first boot-up of the IHS, subsequent to an initiating of runtime;
determine if the first hash and the second hash match; and
in response to the first hash and the second hash not matching:
generate an error message that indicates detection of runtime tampering with the first UEFI driver; and
store the error message to an error log that contains error messages that are generated by the BMC when tampering with a corresponding UEFI image or driver is detected during runtime of the IHS.

16. The detection system of claim 15, wherein the firmware further configures the BMC to:
send a general error notification to a system administrator to alert the system administrator that the first UEFI driver is not the corresponding initial first UEFI driver, the administrator determining specifics of the tampering by accessing the stored error message which contains the specifics of the tampering.

17. The detection system of claim 15, wherein the firmware further configures the BMC to:
during an initialization process of the IHS:
retrieving, from the first memory device, the initial first UEFI driver associated with the first component of the IHS;
generating the second hash from the initial first UEFI driver;
associating the second hash with the initial first UEFI driver; and
storing the second hash to the second memory device.

18. The detection system of claim 15, wherein the firmware further configures the BMC to:
during operation of the IHS:
start a timer;
determine if the timer has expired; and
in response to the timer expiring, initiate retrieving of the first UEFI driver from the first memory device; and resetting and restarting the timer.

19. The detection system of claim 15, wherein the BMC is communicatively coupled to the first memory device via a sideband bus.

20. The detection system of claim 19, wherein the sideband bus communicatively couples the BMC to at least one of:
a storage device;
a network interface device;
a graphics device; and
a peripheral component interconnect device.

* * * * *